United States Patent [19]

Sayles

[11] Patent Number: 4,953,476
[45] Date of Patent: Sep. 4, 1990

[54] SILOXANE-BASED ELASTOMERIC INTERCEPTOR MOTOR INSULATION

[76] Inventor: David C. Sayles, 9616 Dortmond Dr. SE., Huntsville, Ala. 35803

[21] Appl. No.: 465,818

[22] Filed: Jan. 16, 1990

[51] Int. Cl.$^5$ .............................................. C06D 5/06
[52] U.S. Cl. .................................. 102/289; 102/291; 264/3.1; 89/1.806
[58] Field of Search ................. 102/289, 291; 264/3.1; 89/1.806

[56] References Cited

U.S. PATENT DOCUMENTS

| | | | |
|---|---|---|---|
| 4,210,474 | 7/1980 | Froach | 149/19.2 |
| 4,232,608 | 11/1980 | Wrightson | 102/103 |
| 4,332,631 | 6/1982 | Herty, III et al. | 149/19.2 |
| 4,458,595 | 7/1984 | Gerrish, Jr. et al. | 102/290 |
| 4,507,165 | 3/1985 | Herring | 102/289 X |
| 4,803,019 | 2/1989 | Graham et al. | 102/290 X |
| 4,821,511 | 4/1989 | Felix et. al. | 102/289 X |

FOREIGN PATENT DOCUMENTS 1412397 11/1975 United Kingdom .............. 102/289

Primary Examiner—Peter A. Nelson

[57] ABSTRACT

A method of installing a polysiloxane insulation in an interceptor rocket motor comprises of applying an adhesive composition, which is compatible with a composite rocket motor case and polysiloxane with which it interfaces; applying a polysiloxane in an uncured state and any added reinforcing fibers to the inside surface of rocket motor case containing the adhesive coating; curing the polysiloxane to form a polysiloxane insulation; casting a solid propellant composition on the cured siloxane insulation; and curing the cast solid propellant composition to complete the method of installing a polysiloxane insulation. The polysiloxane insulation enables the use of a wider selection of reinforcing fibers, even fragile fibers, since the fibers can be incorporated with less energy and the mixing and extruding of the polysiloxane does not destroy the fiber length.

3 Claims, 2 Drawing Sheets

AGED IN AIR AT 400°F

\* CURVE A IN HRS
\*\* CURVE B IN DAYS

SILOXANE-BASED ELASTOMERIC INTERCEPTOR MOTOR INSULATION

DEDICATORY CLAUSE

The invention described herein may be manufactured, used, and licensed by or for the Government for governmental purposes without the payment to me of any royalties thereon.

BACKGROUND OF THE INVENTION

An interceptor rocket motor insulation system is typically based on a hydrocarbon prepolymer such as ethylene-propylene-diene monomer (EPDM), acrylonitrile-butadiene rubber (NBR), styrene-butadiene rubber (SBR), or polyisoprene (PIP) rubber. Reinforcement fibers such as silica or Aramid (e.g; aromatic polyamide fiber, an example is poly-p-ethylene terephthalamide with trademark Kevlar) are incorporated prior to cure to provide strength and thermal characteristics. The high viscosity of hydrocarbon elastomeric gumstock resins somewhat limit the type reinforcing fibers selected for use to those which are tough and to those fibers which can be satisfactorily incorporated into the high viscosity resin. Additionally, hydrocarbon-based insulations require the incorporation of various modifiers, such as, plasticizers, stabilizers, softeners, etc., before hydrocarbon gumstock can be satisfactorily used in insulation forming and curing. In other words, the chemistry required for using hydrocarbons for insulation material is quite complex and places certain limitations on the system where used.

The requirements for interceptor motor insulation system dictate the need for an insulation system thermal characteristics while also being inert toward various propellant compositions. An extrudable material for ease of application and an insulation material which has superior characteristics in modulus, tensile strength, elongation, and stability in Shore A hardness properties when aged at elevated temperatures and when aged in air at elevated temperatures is a desirable material for use in interceptor motors.

SUMMARY OF THE INVENTION

An interceptor motor insulation system based on a polysiloxane, namely, polydimethylsiloxane has overcome many of the major shortcomings of prior art insulation systems derived from hydrocarbon prepolymers.

Polydimethylsiloxanes contain chains of alternating silicon and oxygen atoms with two methyl groups attached to each silicon atom. Polysiloxanes are made by the polymerization of a low molecular weight cyclic analog. The method of synthesis of polydimethylsiloxane comprises hydrolysis of dichlorodimethylsilane to yield octamethylcyclotetrasiloxane. When octamethylcyclotetrasiloxane is heated above 100° C. in the presence of an acid or base, it polymerizes to form a viscous liquid or a gum.

Polydimethylsiloxane elastomer permits the addition of a wider selection of reinforcing fibers, even those fibers classified as fragile fibers, since the low energy which is required to carry out fibers incorporation does not destroy the fiber length. Such fragile fiber may include mica, graphite whiskers, or silica fibers. After fiber addition the polydimethylsiloxane insulation is passed through a mixer-extruder and transported to an application head where a payoff wheel rolls a strip of insulation onto the inner surface of the rocket motor case as the motor case is being rotated. Insulation curing is achieved after which the solid propellant casting is made onto the cured insulation. Propellant curing is achieved and the finished rocket motor is placed in storage.

DESCRIPTION OF THE PREFERRED EMBODIMENT

Polydimethylsiloxane contain chains of alternating silicon and oxygen atoms with two methyl groups attached to each silicon atom. The syntheses of polysiloxanes are made by the polymerizations of low molecular weight cyclic analogs. In this synthesis, hydrolysis of dichlorodimethylsilane yields octamethylcyclotetrasiloxane. Octamethylcyclotetrasiloxane is subsequently heated above 100° C. in the presence of an acid or a base to form a polymer which is a viscous liquid or a gum. The described synthesis is depicted by the reaction equations shown below under "Synthesis of Polydimethylsiloxane".

SYNTHESIS OF POLYDIMETHYLSILOXANE

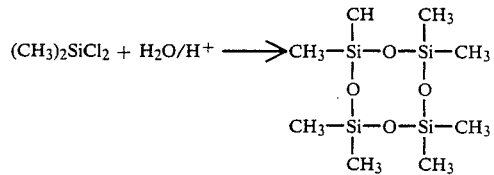

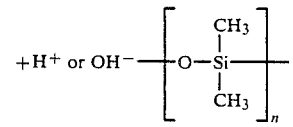

A polysiloxane is represented empirically by the structural formula as follows:

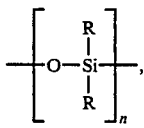

wherein R is an alkyl group and n is a whole integer to provide a molecular weight whereby the polysiloxane elastomer prior to curing has the properties of a viscous liquid or gum.

Figure 1:
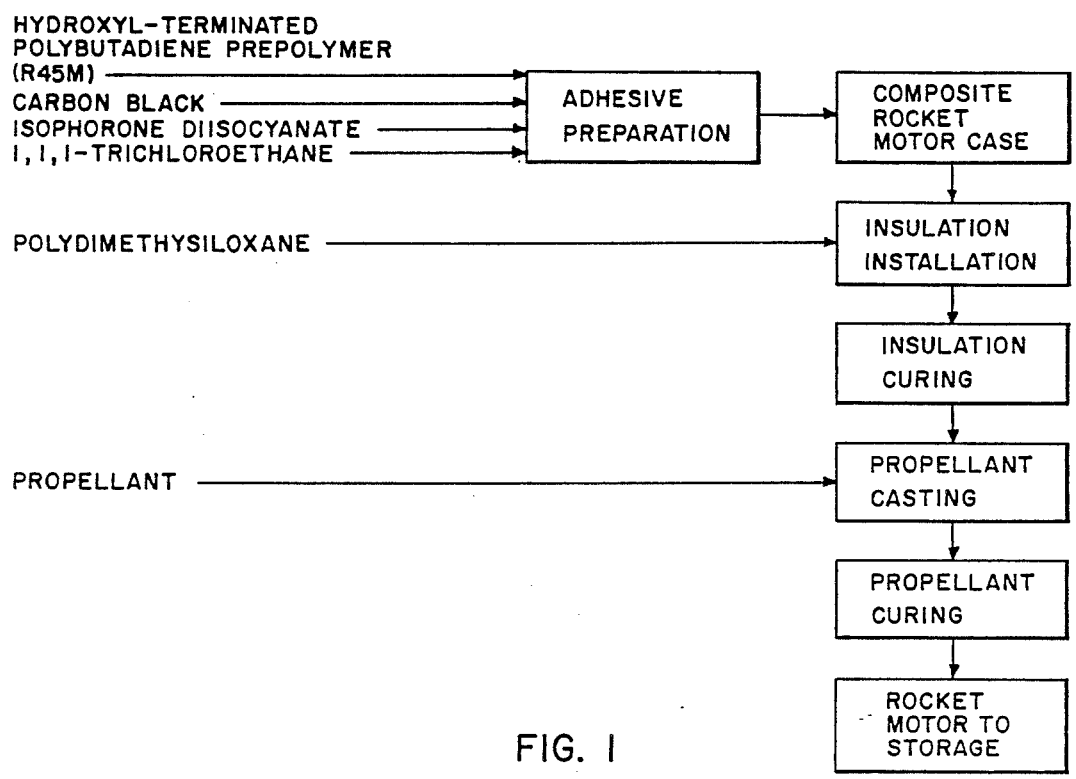
FIG. 1 depicts steps for installing polydimethylsiloxane insulation in a rocket motor case.

In further reference to the Figures of the drawing, FIG. 1 illustrates the sequences of the various unit operations that have to be carried out to load an interceptor rocket motor containing a polydimethylsiloxane insulation. The illustration depicts an adhesive composition preparation from a typical formulation of hydroxyl-terminated polybutadiene prepolymer, carbon black, isophorone diisocyanate and 1,1,1-trichloroethane. The adhesive composition is applied to the inner surfaces of a composite rocket motor case. After applying the adhesive composition, which is compatible with composite rocket motor case and siloxane insulation, to the inner surfaces of the composite rocket motor case, the polydimethylsiloxane insulation is applied and then cured. A propellant composition is cast onto the cured polydimethylsiloxane insulation and the propellant is cured. After curing the propellant, the finished rocket motor is placed in storage.

Applying the polydimethylsiloxane elastomer on the inner surface is done in the following steps:

(1) The polydimethylsiloxane insulation containing fiber filler is passed through an extruder.

(2) The extruded material is transported to an application head where a payoff wheel rolls the strip of insulation onto the inner surface of the motor case as the motor case is being rotated. The axial speed of application head is controlled so that each turn of the strip partly-overlaps the previous turn, similar to the way that a roof is shingled. To apply the insulation uniformly, a microprocessor is used. Its functions are to control the speed of extrusion, the rate of rotation of the motor case, the axial speed of the carriage, and the orientation of the applicator head.

Polydimethylsiloxane insulation offers the following advantages over hydrocarbon-based insulation:

(1) Polydimethylsiloxane is almost completely inert towards various propellant compositions, and as a result is compatible, and promises exceptional long-term aging.

(2) Polydimethylsiloxane requires lesser amounts of reinforcements, (such as silica, Aramid) to have superior thermal characteristics to hydrocarbon insulation.

(3) The high viscosity of hydrocarbon elastomeric gumstock resins require that the reinforcing fiber be tough so that the fiber can be satisfactorily incorporated into the resin.

(4) The hydrocarbon insulations require the incorporation of various modifiers, such as plasticizers, stabilizers, softeners, etc. before hydrocarbon gumstock can be satisfactorily used in insulation forming and curing.

(5) The polydimethylsiloxane elastomer permits the wider selection of reinforcing fibers because of the low energy required to carry out the fiber incorporation process which does not destroy the fiber length.

(6) Polydimethylsiloxane gumstock, of low molecular weight has sufficiently low viscosity so as to permit the incorporation of even the more fragile fibers.

(7) Polydimethylsiloxane insulation offers the performances at higher temperature ranges which are required by high performance interceptor motors without requiring the incorporation of thermally-stabilizing additives that could affect the long-term aging characteristics.

Figure 2:
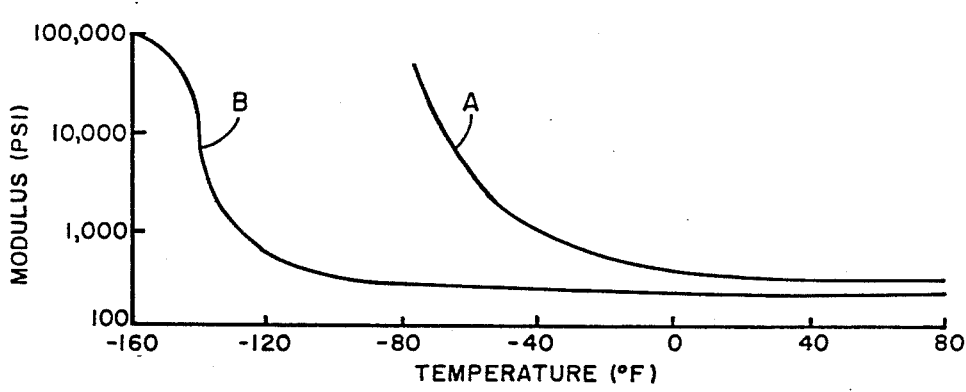
FIG. 2 depicts comparison of changes in modulus of hydrocarbon gumstocks curve A and polydimethylsiloxane gumstocks curve B over temperature range from −160° to 80° F.
Figure 3:
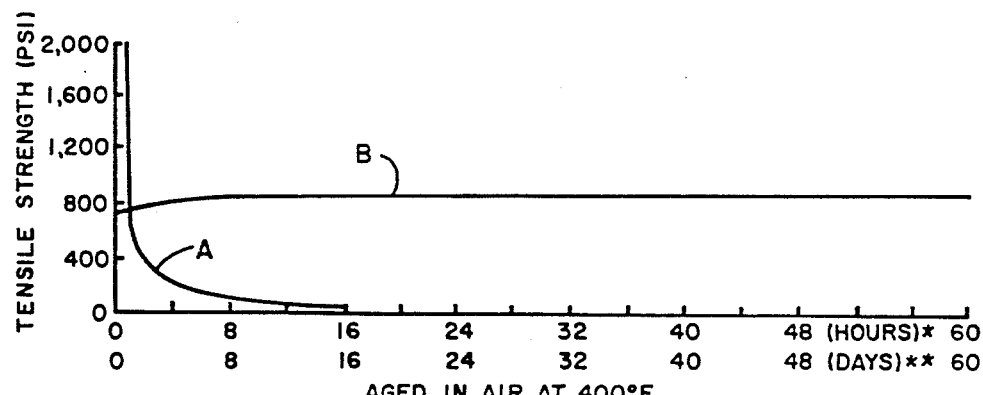
FIG. 3 depicts comparison of changes in tensile strength of hydrocarbon gumstocks curve A and polydimethylsiloxane gumstocks curve B when aged in air at 400° F. for hours and days respectively.
Figure 4:
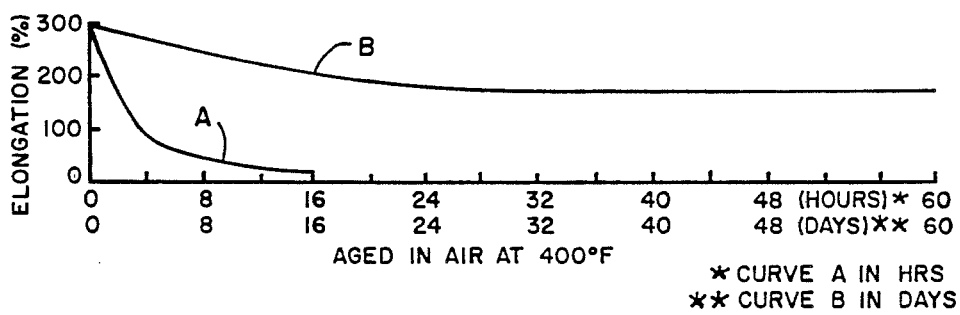
FIG. 4 depicts comparison of changes in elongation of hydrocarbon gumstocks curve A and polydimethylsiloxane gumstocks curve B when aged in air at 400° F. for days and hours respectively.
Figure 5:
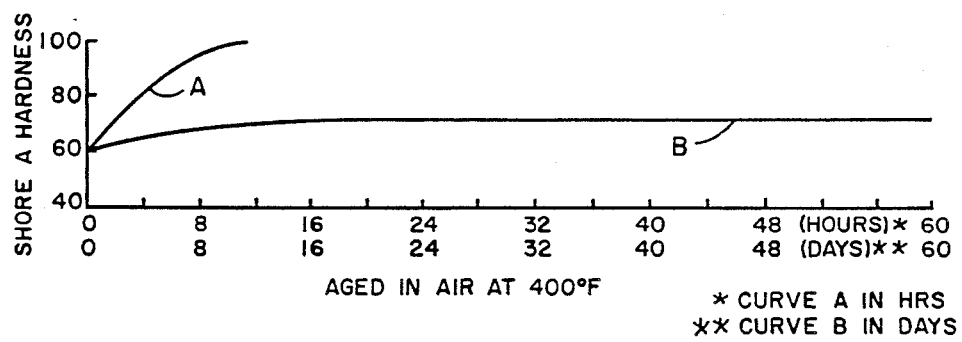
FIG. 5 depicts the comparison of the changes in Shore A hardness of hydrocarbon gumstocks curve A and polydimethylsiloxane gumstocks Curve B when aged in air at 400° F. for days and hours respectively.
Figure 6:
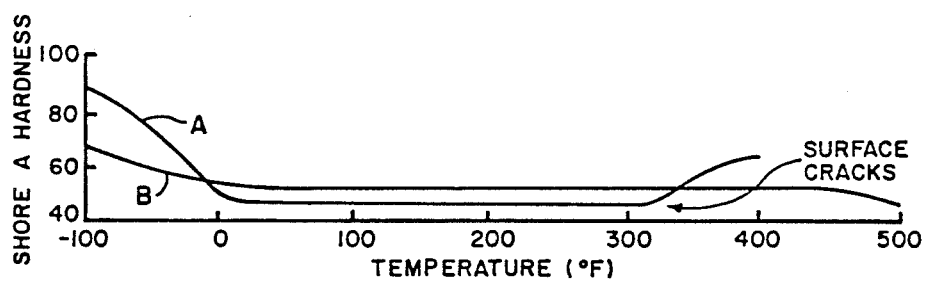
FIG. 6 depicts comparison of changes in Shore A hardness of hydrocarbon gumstocks curve A and polydimethylsiloxane gumstocks curve B over temperature range from −100° F. to 500° F.

(8) Polydimethylsiloxane rubber has shown considerably superior characteristics in retention of modulus (FIG. 2) tensile strength (FIG. 3), elongation (FIG. 4), and changes in Shore A hardness when aged in air at 400° F. (FIG. 5) and with temperature (FIG. 6).

I claim:

1. A method of installing a polysiloxane insulation in an interceptor rocket motor, said method comprising of completing following the steps:

(i) providing a composite rocket motor case designed for use in an interceptor rocket motor;

(ii) applying an adhesive siloxane composition that is compatible with said composite rocket motor case to the inner surfaces of said composite rocket motor case;

(iii) providing a polysiloxane elastomer having an empirical formula represented by the following structural formula:

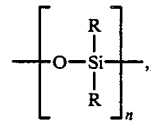

wherein R is an alkyl group and n is a whole integer and said polysiloxane elastomer prior to curing has the physical properties of a viscous fluid;

(iv) introducing said polysiloxane elastomer and any added reinforcing fibers, including fragile fibers, into a mixer-extruder;

(v) extruding and transporting said polysiloxane elastomer and any added reinforcing fibers to an application head where a payoff wheel rolls a strip of said polysiloxane elastomer and any added reinforcing fibers onto the inner surface of said composite rocket motor case as said composite rocker motor case is being rotated and while said application head is moved axially by carriage means;

(vi) controlling the axial speed of said application head so that each turn of said strip overlaps the previous turn similar to the way that a roof is shingled;

(vii) means for controlling the uniformity of application of said polysiloxane elastomer and any added reinforcing fibers to complete the installing of said polysiloxane insulation in an uncured state;

(viii) curing said polysiloxane insulation;

(ix) casting a solid propellant composition onto said cured polysiloxane insulation; and;

(x) curing said solid propellant composition to complete said method of installing a polysiloxane insulation in an interceptor rocket motor.

2. The method of claim 1 wherein said polysiloxane is polydimethylsiloxane and wherein said reinforcing fibers added include fragile fibers selected from mica, graphite whiskers, and silica fibers.

3. The method of claim 2 wherein said means for controlling the uniformity of application of said polydimethysiloxane with said reinforcing fibers added is controlled by a microprocessor which controls the functions of speed of said extrusion, the rate of rotation of said composite rocket motor case, the axial speed of said carriage means, and the orientation of said application head to said inner surface of said composite rocket motor case.

* * * * *